US008657503B2

(12) United States Patent
Serafini et al.

(10) Patent No.: US 8,657,503 B2
(45) Date of Patent: Feb. 25, 2014

(54) BEARING HUB UNIT FOR A MOTOR-VEHICLE WHEEL

(75) Inventors: Andrea Serafini, Pinerolo (IT); Edward White Ladell, Detroit, MI (US)

(73) Assignee: Aktiebolaget SKF, Gothenborg (SE)

( * ) Notice: Subject to any disclaimer, the term of this patent is extended or adjusted under 35 U.S.C. 154(b) by 44 days.

(21) Appl. No.: 13/324,116

(22) Filed: Dec. 13, 2011

(65) Prior Publication Data

US 2012/0155795 A1    Jun. 21, 2012

(30) Foreign Application Priority Data

Dec. 16, 2010    (IT) ............................ TO2010A001005

(51) Int. Cl.
*F16C 33/76*    (2006.01)

(52) U.S. Cl.
USPC .......................................... 384/544; 384/489

(58) Field of Classification Search
USPC .......................................... 384/544, 448, 489
See application file for complete search history.

(56) References Cited

U.S. PATENT DOCUMENTS

| 5,217,137 A | 6/1993 | Andrews |
| 2005/0259902 A1* | 11/2005 | Ohtsuki et al. ............... 384/448 |
| 2011/0181101 A1* | 7/2011 | Sicilia et al. ............... 301/108.1 |

FOREIGN PATENT DOCUMENTS

| JP | 2005-321375 A | 11/2005 |
| JP | 2010-106909 A | 5/2010 |
| JP | 2010190421 A * | 9/2010 |
| WO | 2007/108018 A1 | 9/2007 |
| WO | 2010/059355 A1 | 5/2010 |
| WO | WO2010050201 A1 | 5/2010 |
| WO | WO2010059355 A1 | 5/2010 |

* cited by examiner

*Primary Examiner* — Thomas R Hannon
(74) *Attorney, Agent, or Firm* — Bryan Peckjian; SKF USA Patent Depart

(57) ABSTRACT

Bearing-hub unit for a motor-vehicle wheel, having an axis of rotation and provided with a stationary bearing outer ring bounded by a side surface transverse to the axis of rotation; a radially inner rotatable hub; a bearing inner ring fixed onto the hub and defining together with the outer ring a cavity devoid of any sealing device; an encoder arranged inside the cavity and fixed externally on the inner ring; and a protective cover which is made of non-ferromagnetic material and is mounted on the outer ring in axial abutment against the side surface so as to protect the encoder and close the cavity; there being provided a static sealing element which is joined to an outer edge of the protective cover and has a first sealing portion situated between the protective cover and the outer ring.

9 Claims, 3 Drawing Sheets

BEARING HUB UNIT FOR A MOTOR-VEHICLE WHEEL

CROSS-REFERENCE TO RELATED APPLICATION

This United States Non-Provisional Utility application claims the benefit of Italian Patent Application Serial No. TO2010A001005, filed on 16 Dec. 2010, which is incorporated herein in its entirety.

FIELD OF THE INVENTION

The present invention relates to a bearing-hub unit for a motor-vehicle wheel.

SUMMARY OF THE INVENTION

The present invention relates to a bearing-hub unit for a motor-vehicle wheel. In particular, the present invention relates to a bearing-hub unit having an axis of rotation and comprising:
- a stationary bearing outer ring bounded by a side surface transverse to the axis of rotation;
- a radially inner rotatable hub;
- a bearing inner ring fixed onto the hub and defining together with the stationary outer ring a cavity devoid of any sealing device;
- a magnetic encoder arranged inside the cavity and fixed externally on the inner ring; and
- a protective cover that is made of non-ferromagnetic material and is mounted on the outer ring in axial abutment against the side surface so as to protect the encoder and close the cavity.

The bearing-hub units of the type described above are installed inside respective uprights of vehicles and are exposed to the action of external agents such as dust, sand and water which, over time, tend to penetrate between the protective cover and the outer ring, filling the cavity, thus hindering both correct reading of the signal sent from the encoder and correct operation of the bearing.

The object of the present invention is to provide a bearing-hub unit for a motor-vehicle wheel, which is able to solve in a simple and reliable manner the drawbacks described above.

According to the present invention a bearing-hub unit for a motor-vehicle wheel is provided, said unit having the characteristic features indicated in the accompanying claims

BRIEF DESCRIPTION OF THE DRAWINGS

The invention will now be described with reference to the accompanying drawings which show a non-limiting example of embodiment thereof and in which.

Like reference numerals refer to like parts throughout the various views of the drawings.

DETAILED DESCRIPTION OF THE INVENTION

Figure 1:
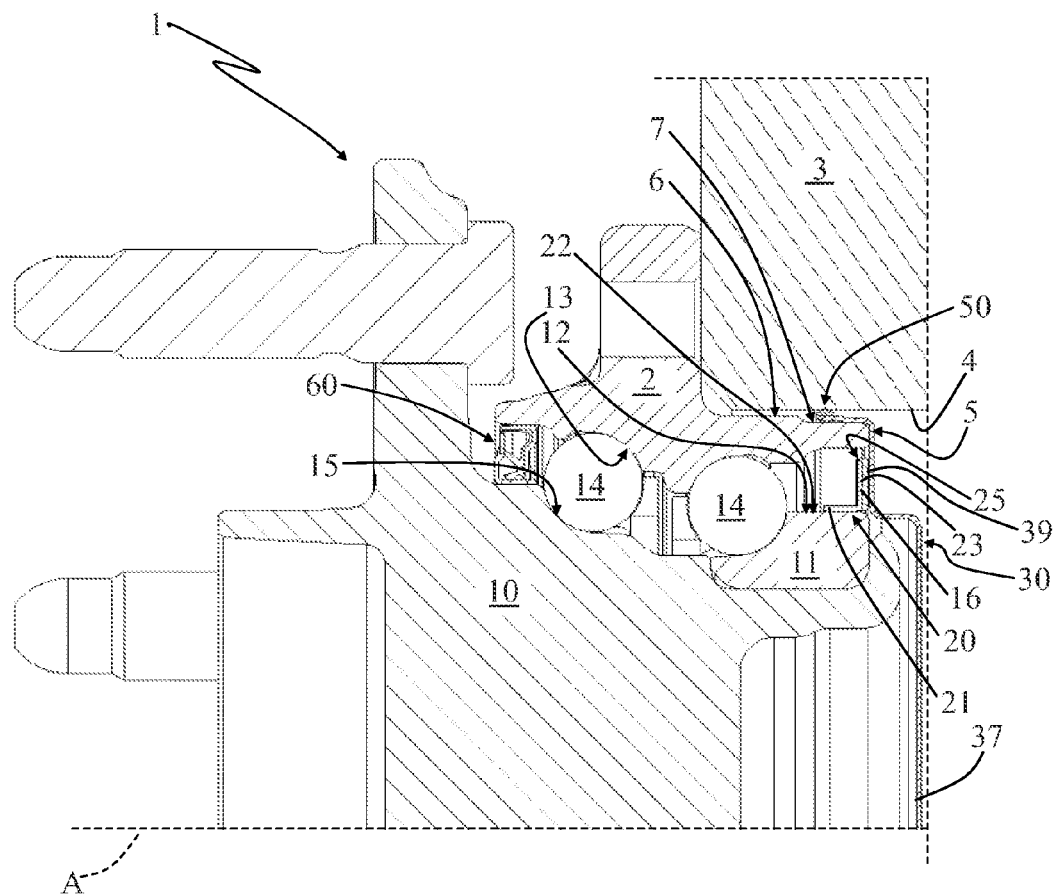
FIG. 1 shows schematically, with parts cross-sectioned and parts removed for the sake of clarity, a preferred embodiment of the bearing-hub unit for a motor-vehicle wheel according to the present invention.

With reference to FIG. 1, 1 denotes in its entirety a bearing-hub unit for a motor-vehicle wheel.

The unit 1 has an axis of rotation A and comprises an outer ring 2, which is a stationary ring of a bearing and can be fixed in an upright 3 of a suspension (not shown) of a motor vehicle. In particular, the outer ring 2 can be fixed in a cylindrical seat 4 of the upright 3 and is bounded: in the axial direction, by a side surface 5 transverse to the axis A of rotation; and, in the radial direction, by an outer surface 6 coaxial with the axis A.

The surface 6 is designed to be arranged partly in contact with the seat 4 and has a radially lower portion 7 transverse and adjacent to the side surface 5.

The bearing-hub unit also comprises a hub 10 which is rotatable about the axis A and is mounted radially inside the ring 2, and an inner ring 11, which is a rotatable ring of a bearing and is fixed by means of rolling onto the hub 10 on the axially inner side, or so-called "inboard side", so as to define an annular cavity 12 with the outer ring 2.

The outer ring 2 forms two radially outer raceways 13 for respective series of rolling elements 14, in this case balls, while the corresponding radially inner raceways 15 are formed, respectively, by the hub 10 and by the inner ring 11.

If on the axially outer side, or so-called "outboard side", of the unit 1 a conventional sealing device 60 is provided for sealing the annular space between the outer ring 2 and the hub 10, a device of this kind is absent on the inboard side of the unit 1 for sealing the annular cavity 12, inside which the unit 1 comprises a magnetic encoder 16 in the form of an annular disc fixed to a support ring 20 with an L-shaped cross-section mounted on the inner ring 11.

The support ring 20 has a cylindrical portion 21 that is fixed in a forced manner onto an outer cylindrical surface 22 of the inner ring 11, and a flange 23, which extends in a radially outer direction from the cylindrical portion 21. The encoder 16 is mounted on the flange 23 on the side of the flange 23 opposite to the rolling elements 14 and extends radially into the vicinity of an inner cylindrical surface of the outer ring 2, leaving a radial slit 25 such as to prevent contact between the (rotating) encoder 16 and the (non-rotating) outer ring 2 also in the case of incorrect assembly of the encoder 16 and/or in the presence of high external loads, in particular lateral loads, tending to flex the bearing in an axial plane.

The unit 1 also comprises a protective cover 30 which is made of a non-ferromagnetic material (for example aluminium, copper or the like) and is mounted on the inboard side in order to protect the encoder 16, sealing the bearing and leaving a minimum axial gap 39 between the cover 30 and the encoder 16 itself.

The cover 30 has a substantially cup-shaped form and comprises a radial peripheral portion 31 in axial abutment against the side surface 5 of the outer ring 2 and, in the preferred embodiment shown in FIG. 1, an axial cylindrical body 32 which is joined to the portion 31 and terminates, on the side opposite to that joined to the portion 31, with a free annular outer edge 33.

In particular the body 32 has a diameter increasing in a discrete manner towards the outer edge 33 and comprises:
- a cylindrical portion 34 directly connected to the portion 31 and fitted in a forced manner onto the radially lower portion 7 of the surface 6; and
- a portion 35, which is axially adjacent to the portion 34 and is radially raised with respect to the portion 7 and with respect to the portion 34 so as to define an annular passage 36 of given axial length bounded on one side by the edge 33.

The body 32 comprises, finally, a connecting portion 38 which joins together the portions 34 and 35 and is arranged inclined with respect to the said portions 34 and 35 with an inclination which can be defined at the design stage depending on the assembly conditions of the body 32 and is variable by a few degrees up to a maximum of 90°, namely until the connecting portion 38 is at right angles to the portions 34 and 35.

The connecting portion 38 extends along the axis A with axial dimensions smaller than the axial dimensions of the portions 34 and 35 and provides the portion 35 with radial elasticity, namely it allows the portion 35 to flex elastically in the radial direction. Moreover, the portion 38, while imparting elasticity to the portion 35, nevertheless ensures the rigidity of the structure of the body 32 as a whole, therefore preventing possible separation of the portion 34 from the radially lower portion 7 following fixing of the portion 34 on the outer ring 2.

The cover 30 comprises, finally, a wall 37 which is arranged at right angles to the axis A and centrally with respect to the portion 31 in a position axially facing the hub 10 and is joined to the portion 31 so as to complete isolation externally of the bearing.

Figure 2:
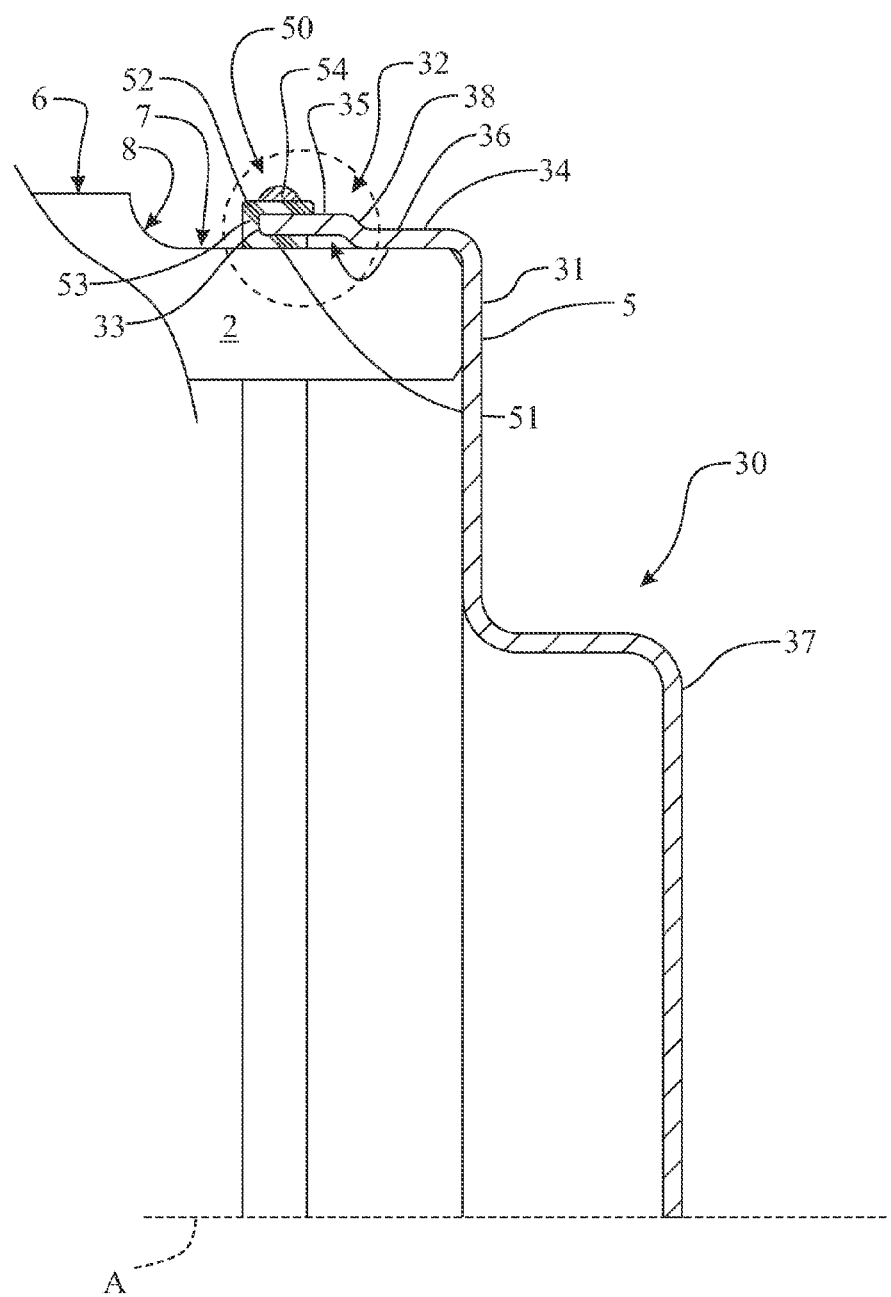
FIG. 2 shows, on a larger scale and cross-sectioned, a detail of FIG. 1.

As shown more clearly in FIG. 2, the unit 1 comprises, finally, a static sealing element 50 which is joined to the portion 35 of the protective cover 30 and comprises:

an inner sealing portion 51 situated between the protective cover 30 and the outer ring 2 so as to close the passage 36 in a sealed manner, filling it at least partially; and an outer sealing portion 52 arranged radially on the outside of the inner portion 51 and designed to be positioned between the protective cover 30 and the seat 4 of the upright 3.

Figure 3:
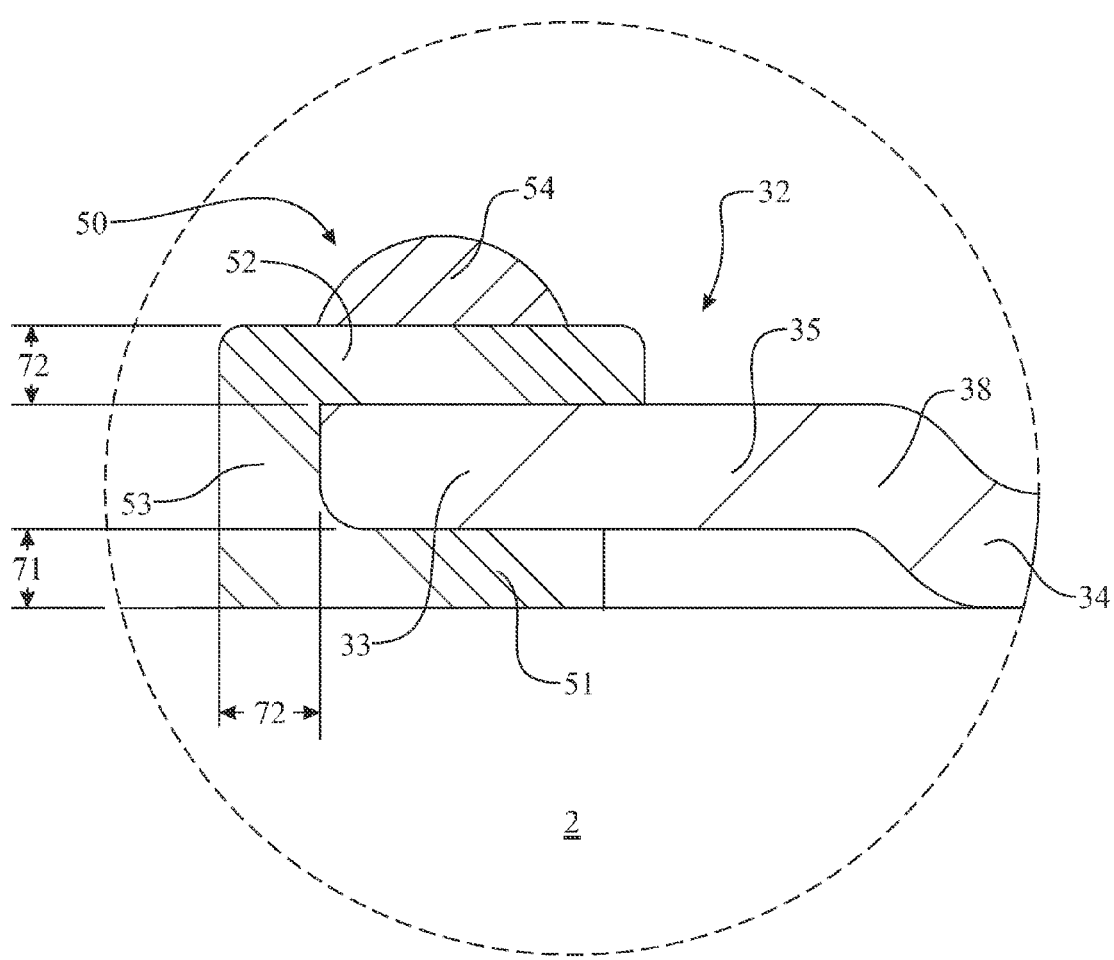
FIG. 3 shows, on a larger scale and cross section, a larger scaled view detailing a static sealing element.

The static sealing element 50 (detailed in FIG. 3) comprises, moreover, a connecting portion 53 that joins together the inner portion 51 and the outer portion 52 and, together with the inner portion 51 and the outer portion 52, surrounds entirely the edge 33 of the protective cover 30.

While the inner portion 51 has the function of sealing the passage 36, preventing the entry of any solid or liquid impurities inside the bearing, the outer portion 52 has both the function of preventing any impurities from passing between the cover 30 and the upright 3, protecting the parts from oxidation and/or galvanic corrosion, and the function of ensuring simple assembly of the unit 1 in the upright 3 itself. Moreover, the inner portion 51 may extend axially along the passage 36, either only partly as in the preferred example of embodiment shown here, or may extend completely along the passage 36 until it makes contact with the connecting portion 38.

The connecting portion 53, the inner portion 51 and the outer portion 52 have a thickness 71 and 72 (respectively) that are substantially similar to each other, but in order to improve further the ease of assembly of the unit 1 in the upright 3, the static sealing element 50 comprises an annular projection 54 which is integral with the outer portion 52 and extends radially towards the outside of the outer portion 52. The annular projection 54 has, preferably, but not necessarily, a symmetrical form with respect to a plane of symmetry transverse to the axis A of rotation. If, according to an embodiment, which is not shown but can be easily deduced from that described hitherto, the outer portion 52 should extend as far as the connecting portion 38 and, optionally, beyond the connecting portion 38, the annular projection 54 could have a form which is no longer symmetrical, but without losing its isolating functions described above.

The connecting portion 53, the inner portion 51 and the outer portion 52 are made of the same material, preferably an elastomer material, and the annular projection 54 may also be made of the same material as the portions mentioned hitherto. In other words, the entire static sealing element 50 may be made of a single elastomer material preferably by means of direct vulcanization onto the protective cover 30.

Alternatively, should the circumstances require it, either because of particular operating conditions or because of particular geometric conditions, the annular projection 54 may be made of a material which is different from the material of the portions 51, 52 and 53.

Owing to the form which has a diameter axially increasing towards the outboard side of the body 32 it is possible to determine at the design stage the magnitude of a radial thickness S of the passage 36, therefore allowing better modulation of a radial compressive force of the inner sealing portion 51 against the outer ring 2 and preventing possible separation of the portion 34 from the radially lower portion 7.

According to an embodiment which is not shown but can be easily deduced from that described above, the connecting portion 53 of the static sealing element 50 may have an axial thickness 73 which is greater than the thickness 71 and 72 of the portions 51 and 52, respectively, so as to define a lug of material, preferably elastomer material, which extends axially from the edge 33 until it makes contact with a curvilinear surface 8 connecting the lower portion 7 with the remainder of the surface 6. This lug is intended to come into contact with the surface 8 with an action, which is both axial and radial, increasing even further the sealing capacity of the static sealing element 50.

In the case described hitherto, where the static sealing element 50 is provided with an elastomer lug, the edge 33 could be advantageously folded radially outwards in order to impart a greater rigidity to the lug itself.

It is understood that the invention is not limited to the embodiment described and illustrated here, which is to be regarded as an example of embodiment of the bearing-hub unit for a motor-vehicle wheel, but instead may be subject to further modifications regarding the forms and arrangements of parts and constructional or assembly details.

What we claim is:

1. A bearing-hub unit for a motor vehicle wheel, the bearing-hub unit having an axis of rotation and comprising:
   a stationary bearing outer ring bounded by a side surface transverse to the axis of rotation;
   a radially inner rotatable hub;
   a bearing inner ring fixed onto the hub and defining together with the outer ring a cavity devoid of any sealing device;
   an encoder arranged inside the cavity and fixed externally on the inner ring; and
   a protective cover that is made of non-ferromagnetic material and is mounted on the outer ring in axial abutment against the side surface so as to protect the encoder and close the cavity; and
   a static sealing element joined to an outer edge of the protective cover and comprises:
      an inner portion located between the protective cover and the outer ring and forming a seal therebetween,
      an outer portion located on a side of the protective cover opposite from the inner portion,
      a connecting portion extending between the inner portion and the outer portion, and
      an annular projection positioned on the outer portion and extending outwardly away from the protective cover;
   wherein the inner portion, the connecting portion, and the outer portion are formed by the same material, the annular projection being formed by a different material than the inner portion, the outer portion, and the connecting portion.

2. A bearing-hub unit as recited in claim 1, wherein the axial thickness of the connecting part of the static sealing element is greater than the radial thickness of either one of the inner portion and the outer portion.

3. A bearing-hub unit as recited in claim 2, wherein the connecting portion, the inner portion, and the outer portion entirely surrounds the outer edge of the protective cover.

4. A bearing-hub unit as recited in claim 3, wherein the outer edge of the protective cover is folded radially outwards to impart greater rigidity to the static sealing element.

5. A bearing-hub unit as recited in claim 4, wherein the annular projection has an outer perimeter that is arcuate and convex when viewed in axial cross section.

6. A bearing-hub unit as recited in claim 5, the outer portion further comprising a symmetrical form with respect to a plane of symmetry transverse to the axis of rotation, the radial thickness of the inner portion and the outer portion being the same.

7. A bearing-hub unit as recited in claim 6, wherein the radial thickness of the annular projection is at least as great as the radial thickness of the outer portion.

8. A bearing-hub unit as recited in claim 7, wherein the protective cover has a substantially cup-shaped form and further comprising a mounting body with a diameter increasing in a discrete manner towards the outer edge;

the mounting body further comprising a portion keyed onto the outer ring and a portion radially raised with respect to the outer ring so as to define an annular passage of given axial length.

9. A bearing-hub unit as recited in claim 8, the mounting body further comprising a connecting portion which joins the keyed portion and the raised portion together and is arranged inclined with respect to the keyed portion and to the raised portion with an inclination variable from a few degrees to a maximum of 90 degrees.

* * * * *